United States Patent
Ekstrom et al.

(10) Patent No.: US 9,577,493 B2
(45) Date of Patent: Feb. 21, 2017

(54) MOTOR AND ELECTRONICS COOLING SYSTEM FOR A HIGH POWER CORDLESS NAILER

(71) Applicant: Black & Decker Inc., Newark, DE (US)

(72) Inventors: Erik Ekstrom, Woodstock, MD (US); David J. Smith, Columbia, MD (US)

(73) Assignee: Black & Decker Inc., New Britain, CT (US)

( * ) Notice: Subject to any disclaimer, the term of this patent is extended or adjusted under 35 U.S.C. 154(b) by 809 days.

(21) Appl. No.: 13/840,015

(22) Filed: Mar. 15, 2013

(65) Prior Publication Data

US 2014/0076953 A1   Mar. 20, 2014

Related U.S. Application Data (60) Provisional application No. 61/703,468, filed on Sep. 20, 2012.

(51) Int. Cl.
| | |
|---|---|
| *H02K 9/06* | (2006.01) |
| *B23Q 11/12* | (2006.01) |
| *B25C 1/06* | (2006.01) |
| *B25F 5/00* | (2006.01) |
| *B25F 5/02* | (2006.01) |

(52) U.S. Cl.
CPC .............. *H02K 9/06* (2013.01); *B23Q 11/127* (2013.01); *B25C 1/06* (2013.01); *B25F 5/008* (2013.01); *B25F 5/02* (2013.01)

(58) Field of Classification Search
CPC ........... B25F 5/008; B25F 5/02; B23Q 11/12; B23Q 11/126–11/128; H02K 9/02–9/06; H02K 7/145

USPC .............................. 227/129; 173/217; 310/63
See application file for complete search history.

(56) References Cited

U.S. PATENT DOCUMENTS

| | | | |
|---|---|---|---|
| 3,694,680 A | 9/1972 | Jacyno |
| 3,699,366 A | 10/1972 | Wood |
| 3,978,354 A | 8/1976 | Lee et al. |
| 4,142,120 A | 2/1979 | Hallerback |
| 4,219,749 A | 8/1980 | Rettberg |
| 4,295,268 A | 10/1981 | Punshon et al. |
| 4,322,647 A | 3/1982 | Neroda et al. |
| 4,342,929 A | 8/1982 | Horne |
| 4,384,224 A | 5/1983 | Spitler et al. |
| 4,449,660 A | 5/1984 | Smith, III |

(Continued)

*Primary Examiner* — Hemant M Desai
*Assistant Examiner* — Valentin Neacsu
(74) *Attorney, Agent, or Firm* — Harness, Dickey & Pierce, PLC (57) ABSTRACT

A battery powered tool includes a housing containing a motor assembly. A fan positioned in the housing is rotated by the motor assembly. The fan has a circular ring/body and further has multiple fan blades directly connected to the circular ring body. The circular ring/body defines a concave shaped surface having the fan blades directly connected to the concave shaped surface. A housing cover includes: first and second extending walls; a slot created between the first and second extending walls; and multiple air intake vents all positioned in a lower housing zone separated from an upper housing zone by the slot. An electronics module is positioned in the housing proximate to the housing cover lower housing zone such that air entering the intake vents passes only through the lower housing zone and past the electronics module to cool the electronics module before entering the fan.

10 Claims, 8 Drawing Sheets

(56) References Cited

U.S. PATENT DOCUMENTS

| | | | |
|---|---|---|---|
| 4,498,230 A | 2/1985 | Harris et al. | |
| 4,583,600 A | 4/1986 | Smith, III | |
| 4,593,221 A | 6/1986 | Harris et al. | |
| 4,613,781 A | 9/1986 | Sanders | |
| 4,746,828 A | 5/1988 | Nado et al. | |
| 4,763,031 A | 8/1988 | Wang | |
| 4,800,312 A | 1/1989 | Wacek et al. | |
| 5,382,855 A | 1/1995 | Cousin | |
| 5,814,908 A * | 9/1998 | Muszynski | F04D 25/082 310/58 |
| 5,818,142 A | 10/1998 | Edleblute et al. | |
| 6,030,286 A * | 2/2000 | Kameoka | B60H 1/00471 415/119 |
| 6,123,158 A * | 9/2000 | Steffen | H02K 11/33 173/117 |
| 6,321,622 B1 * | 11/2001 | Tsuge | B25F 5/02 81/185.2 |
| 6,661,144 B1 * | 12/2003 | Diener | F04D 25/026 310/105 |
| 7,303,028 B2 * | 12/2007 | Wu | B25F 5/02 173/170 |
| 7,526,833 B2 | 5/2009 | Cochran et al. | |
| 8,016,574 B2 * | 9/2011 | De Filippis | F04D 25/082 310/59 |
| 8,251,674 B1 * | 8/2012 | Pairaktaridis | H02K 9/06 310/62 |
| 8,302,833 B2 | 11/2012 | Gross et al. | |
| 2002/0158102 A1 * | 10/2002 | Patton | B25C 1/04 227/8 |
| 2004/0046462 A1 * | 3/2004 | Chen | H02K 7/06 310/20 |
| 2004/0263008 A1 * | 12/2004 | Voigt | B25F 5/008 310/58 |
| 2005/0281627 A1 * | 12/2005 | Britz | B23Q 11/0046 408/67 |
| 2006/0232147 A1 * | 10/2006 | Cheng | A63B 22/02 310/52 |
| 2006/0233643 A1 * | 10/2006 | Lin | F04D 25/082 415/220 |
| 2006/0267422 A1 * | 11/2006 | Franz | F04D 29/542 310/67 R |
| 2007/0102471 A1 * | 5/2007 | Gross | B25C 1/06 227/131 |
| 2007/0237591 A1 * | 10/2007 | Ohlendorf | B25D 17/06 408/61 |
| 2008/0193275 A1 * | 8/2008 | De Filippis | H02K 1/276 415/10 |
| 2008/0290745 A1 * | 11/2008 | Riedl | B25F 5/008 310/50 |
| 2009/0028730 A1 * | 1/2009 | Radermacher | F04D 29/4206 417/423.8 |
| 2009/0103263 A1 * | 4/2009 | Fuchs | B25F 5/008 361/695 |
| 2009/0126964 A1 * | 5/2009 | Schroeder | B25F 5/02 173/217 |
| 2010/0123359 A1 * | 5/2010 | Nishikawa | B25B 21/00 310/50 |
| 2010/0218385 A1 * | 9/2010 | Mang | B25F 5/008 30/216 |
| 2010/0311318 A1 * | 12/2010 | Hause | F04D 27/004 454/256 |
| 2012/0001505 A1 * | 1/2012 | Henke | H02K 11/33 310/62 |
| 2012/0013205 A1 * | 1/2012 | Fuchs | H02K 5/14 310/50 |

\* cited by examiner

MOTOR AND ELECTRONICS COOLING SYSTEM FOR A HIGH POWER CORDLESS NAILER

CROSS-REFERENCE TO RELATED APPLICATIONS

This application claims the benefit of U.S. Provisional Application No. 61/703,468, filed on Sep. 20, 2012. The entire disclosure of the above application is incorporated herein by reference.

FIELD

The present disclosure relates to air cooling systems for cordless power tools.

BACKGROUND

This section provides background information related to the present disclosure which is not necessarily prior art.

A fan is commonly provided for drawing air into the housing of hand held cordless (battery powered) power tools that is used to produce an air flow for cooling the electric motor and/or an electronics module having electronic controls for operation of the tool. The cooling capability of known fan and cooling systems is limited by the amount of air the fan can pull through the motor.

SUMMARY

This section provides a general summary of the disclosure, and is not a comprehensive disclosure of its full scope or all of its features.

According to several aspects, a battery powered tool includes a housing containing a motor assembly. A fan is positioned in the housing and is rotated by the motor assembly. The fan has a circular ring/body defining a concave shaped surface and multiple fan blades directly connected to the concave shaped surface. A fan baffle receives air discharged by the fan blades. The fan baffle has at least two differently directed baffle exhausts.

According to further aspects, a battery powered tool includes a housing containing a motor assembly, having: a drive wheel; a support ring connected to the drive wheel and co-rotatable therewith; and multiple rib support members connecting the support ring to the drive wheel, each having a leading edge and a trailing edge. Each of the rib support members further includes: a convex curved outer surface; and a concave curved inner surface joining the convex curved outer surface at each of the leading edge and the trailing edge.

According to other aspects, a battery powered tool includes a housing. A rib is created in the housing. A housing cover includes: first and second extending walls; and a slot created between the first and second extending walls sized to slidably receive the rib when the housing cover is engaged with the housing. The rib when received in the slot of the housing cover separates the housing cover into an upper housing zone and a lower housing zone.

According to other aspects, a battery powered tool includes a housing containing a motor assembly. A fan is positioned in the housing and rotated by the motor assembly. The fan has multiple fan blades. Multiple fan support members are positioned proximate to the fan blades. Multiple fan intake vents are defined between successive ones of the fan support members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings Referring to FIG. 1, a battery powered tool 10 can be, for example, a high powered cordless nailer. Battery powered tool 10 includes a housing 12 which incorporates components such as a motor and drive components connected to a drive portion 14 through which are ejected fasteners 16. The fasteners 16 can be temporarily stored in a magazine 18 which is connected to the drive portion 14 and also supported at a handle 20 used by an operator to manipulate the battery powered tool 10. A trigger 22 is manually depressed by the user to actuate operation of the battery powered tool 10. A battery 24 is releasably connected to the handle 20 and provides operative electrical power for operation of battery powered tool 10.

Battery powered tool 10 provides a cooling system 26 to limit the operating temperature of internal components of battery powered tool 10. Included in cooling system 26 are a plurality of ports or vents such as forward exhaust vents 28, rear exhaust vents 30, and at least one side discharge exhaust vent 32. The number and the discharge directions of exhaust vents is maximized to minimize backpressure, thereby providing a maximum exhaust flow of cooling air as will be described in greater detail in reference to FIG. 3. A rear of the battery powered tool 10 is also the location for a plurality of intake vents which are principally provided in a rear housing cover 34.

Figure 2:
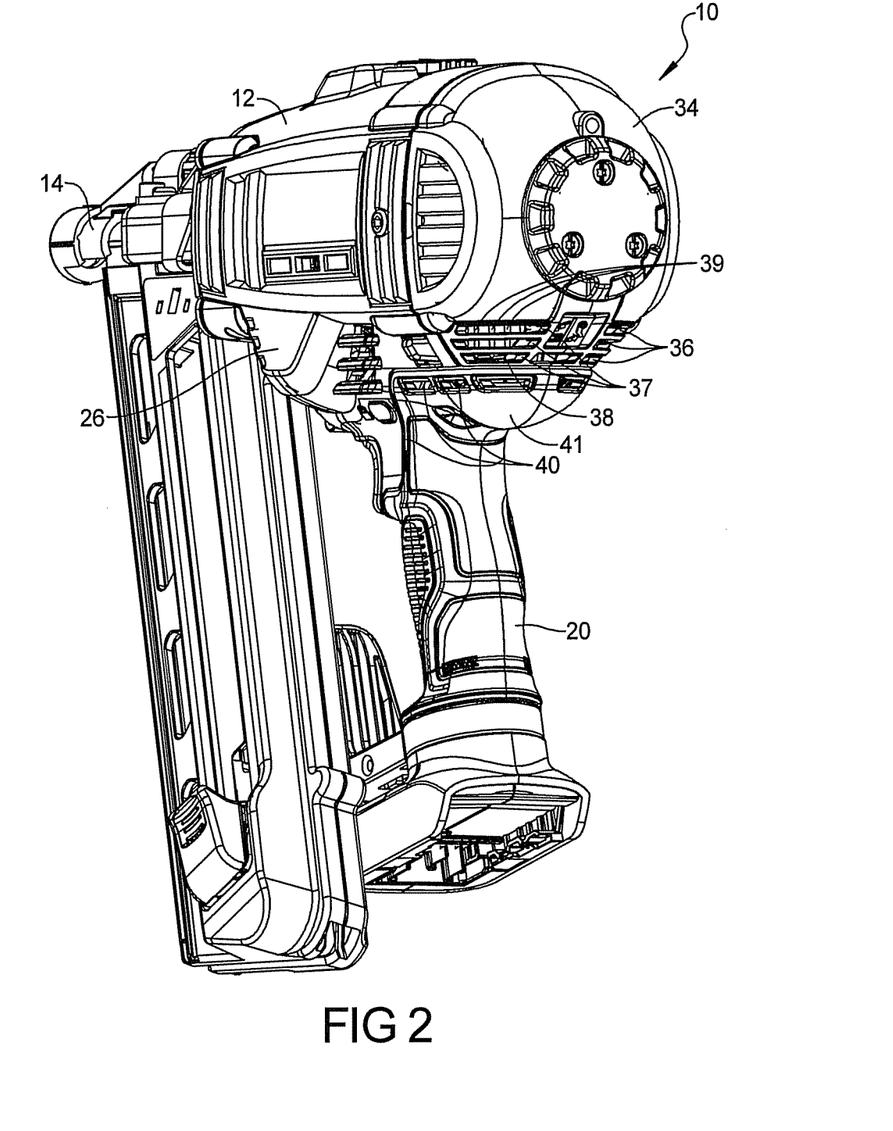
FIG. 2 is a left rear perspective view of the battery powered tool of FIG. 1.

Referring to FIG. 2, with the rear housing cover 34 in its engaged position with housing 12, a plurality of first intake vents 36 and a plurality of second intake vents 37 are created through the rear housing cover 34 which permit an inflow of ambient air for operation of the cooling system 26 by drawing outside ambient temperature air inward at the rear of the tool and directing the ambient air in a forward direction toward the drive portion 14. The initial components cooled by the ambient air are associated with an electronics module 38, which can include a metal heat sink 39. A plurality of third intake vents 40 can also be provided which are created through a rear housing portion 41 which is positioned proximate to and above the handle 20 in a position which cannot be blocked when the operator's hand is engaged with handle 20.

Figure 1:
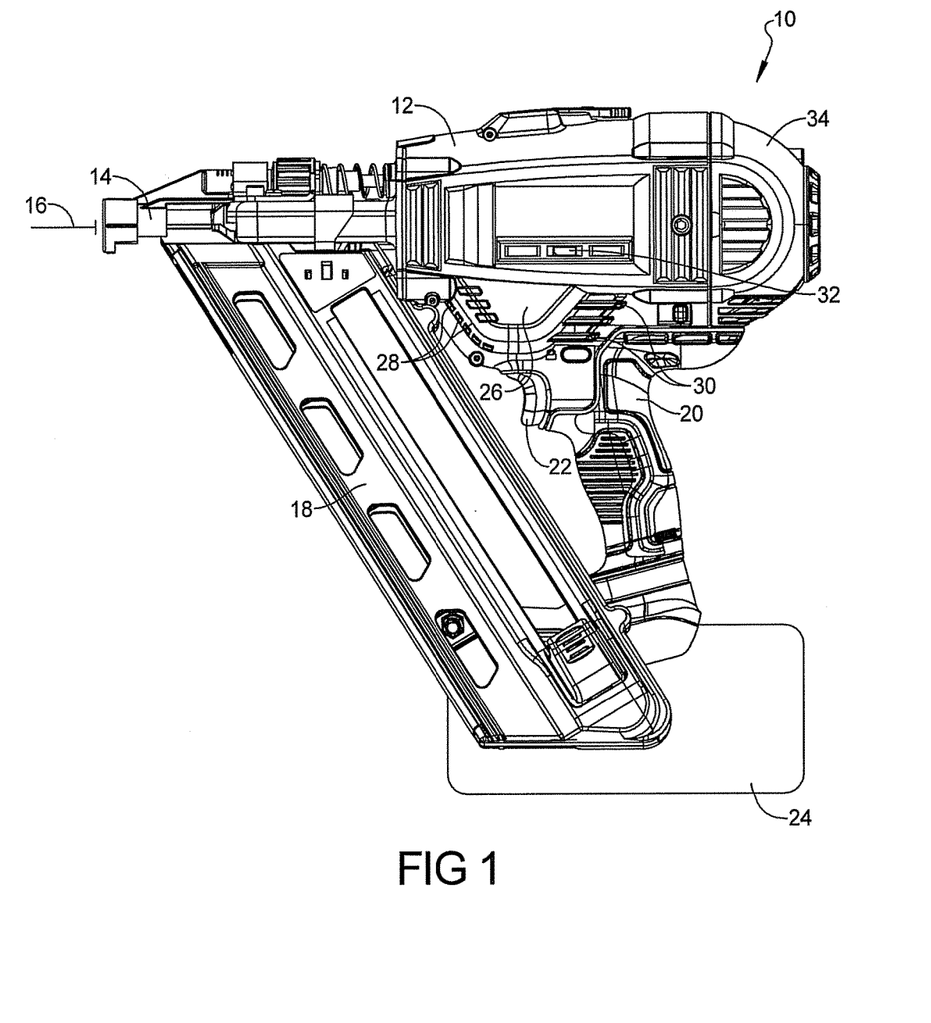
FIG. 1 is a left side elevational view of a battery powered tool of the present disclosure.

Referring to FIG. 3 and again to FIGS. 1-2, with the cover of housing 12 and the rear housing cover 34 removed for clarity, the cooling system 26 includes a fan baffle 42 which exhausts air in multiple different directions to maximize the outflow of the now heated air. Electronics module 38 can further include multiple bus capacitors 44. The electronics module 38 which controls multiple operations of battery operated tool 10 is the first item convection cooled by the ambient air drawn in through the various intake vents prior to the air encountering the components of an electric motor. This ensures that the lowest temperature ambient air is provided to the electronics module 38 before the air encounters any other components of the battery powered tool 10.

Figures 3, 4:
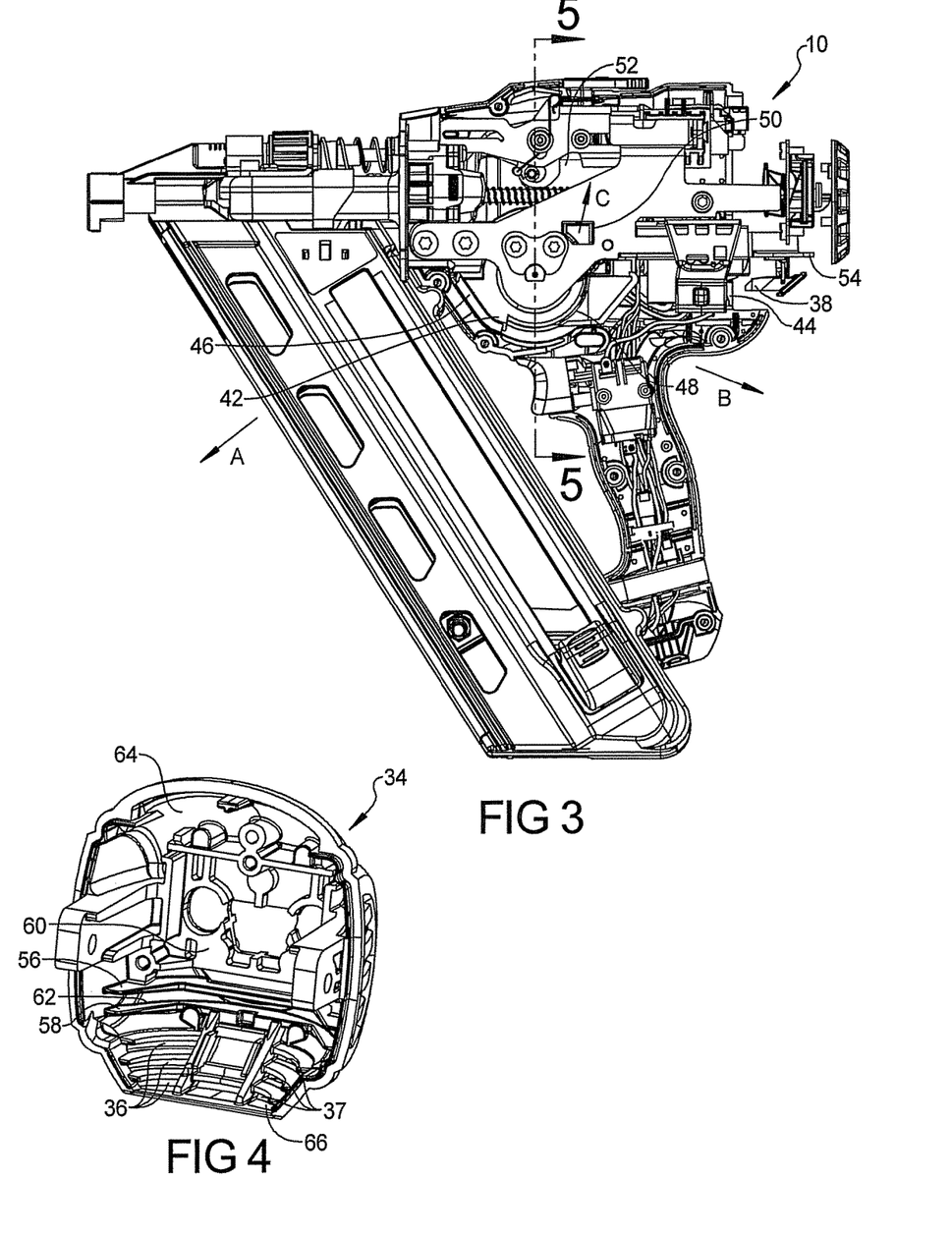
FIG. 3 is a left side elevational view of the battery powered tool of FIG. 1 with the housing covers removed for clarity.
FIG. 4 is a left front perspective view of a rear housing cover for the battery powered tool of FIG. 1.

The fan baffle 42 is configured to provide multiple differently directed exhaust paths for the air flow to exit battery powered tool 10. This minimizes the restriction of air exhausted by battery powered tool 10. The fan baffle 42 therefore includes a first baffle exhaust 46 which directs air in a forward discharge direction "A". A second baffle exhaust 48 discharges air in a rear discharge direction "B". A third baffle exhaust 50 exhausts air in a side/upward discharge direction "C" as well as in a direction toward the viewer as shown in FIG. 3. Maximizing outlet flow from the first, second, and third baffle exhausts 46, 48, 50 minimizes recirculation of heated air into an upper housing space 52 of housing 12, thereby minimizing the amount of heated air which recirculates through battery powered tool 10. Housing 12 further includes a rib 54 at a rear portion of battery powered tool 10. The purpose and function of rib 54 will be described in better detail in reference to FIG. 4.

Referring to FIG. 4 and again to FIG. 3, as previously noted, the rear housing cover 34 provides each of the first and second intake vents 36, 37 through which ambient air is drawn into battery powered tool 10. Rear housing cover 34 also includes a first extending wall 56 which is separated from a second extending wall 58 by a width of the rib 54 which extends from housing 12. When the rear housing cover 34 is in its installed position, rib 54 is positioned between the first and second extending walls 56, 58 and can contact a rear housing wall 60 from which the first and second extending walls 56, 58 forwardly extend. Rib 54 is slidably received in a horizontal slot 62 created between the first and second extending walls 56, 58. The first and second extending walls 56, 58 thereby form an air seal about the rib 54 in the horizontal slot 62. The air seal substantially prevents ambient air drawn into the first and second intake vents 36, 37 from circulating into an upper housing zone 64 of the rear housing cover 34. The ambient air is therefore constrained to flow only through a lower housing zone 66 of the rear housing cover 34 and from there flows into a lower rear portion of the battery powered tool 10. Because the electronics module 38 is positioned proximate to the first and second intake vents 36, 37, ambient air is substantially forced to initially flow over the electronics module 38 as it enters battery powered tool 10.

Figure 5:
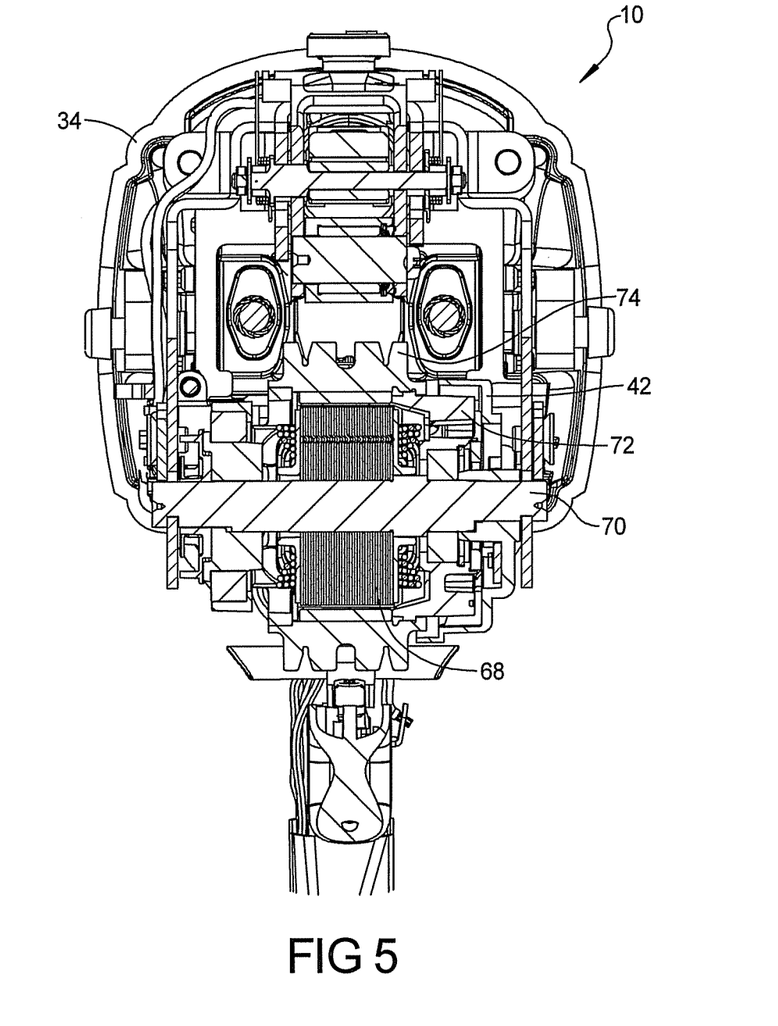
FIG. 5 is front elevational cross sectional view taken at section 5 of FIG. 3.

Referring to FIG. 5 and again to FIG. 3, tool 10 includes a motor assembly 68 which when energized rotates a fan 72 with respect to a stationary motor shaft 70. The fan 72 defines a portion of cooling system 26 and provides the motive force for drawing air into the rear housing cover 34, past the electronics module 38, and then through internal areas of motor assembly 68 to cool motor assembly 68, before being directly exhausted from battery powered tool 10. An outer drive wheel 74 is also rotated by the motor assembly 68 relative to stationary motor shaft 70, the outer drive wheel being used to provide motive power for operation of the drive portion 14. Hence, motor assembly 68 is known in the art as an outer rotor motor.

Referring to FIG. 6 and again to FIGS. 1-5, motor assembly 68 also co-rotates each of the drive wheel 74 and a motor end cap 76 which rotatably supports drive wheel 74 with respect to motor shaft 70 with respect to a bearing support 77. The drive wheel 74, end cap 76, and fan 72 co-rotate with respect to an axis of rotation 78 defined through a longitudinal axis of motor shaft 70. The drive wheel 74 and end cap 76 continuously rotate during operation of motor assembly 68. To connect the drive wheel 74 to the end cap 76, a plurality of rib support members 80 are provided. Because air is also drawn into motor assembly 68 between each of the rib support members 80, the rib support members 80 are shaped to minimize resistance to air flow as the end cap 76 rotates. Each of the rib support members 80 therefore includes a convex curved outer surface 82 and a concave curved inner surface 84. The convex curved outer surface 82 and concave curved inner surface 84 merge to create each of a leading edge 86 and a trailing edge 88 of each of the rib support members 80. Leading edge geometry minimizes high pressure at the leading edge 86, and the geometry of the trailing edge 88 minimizes boundary layer effects at the trailing edge 88. By reducing high pressure at the leading edge and minimizing the boundary layer effects at the trailing edge, the intake of air between the individual rib support members 80 is maximized.

Figure 6:
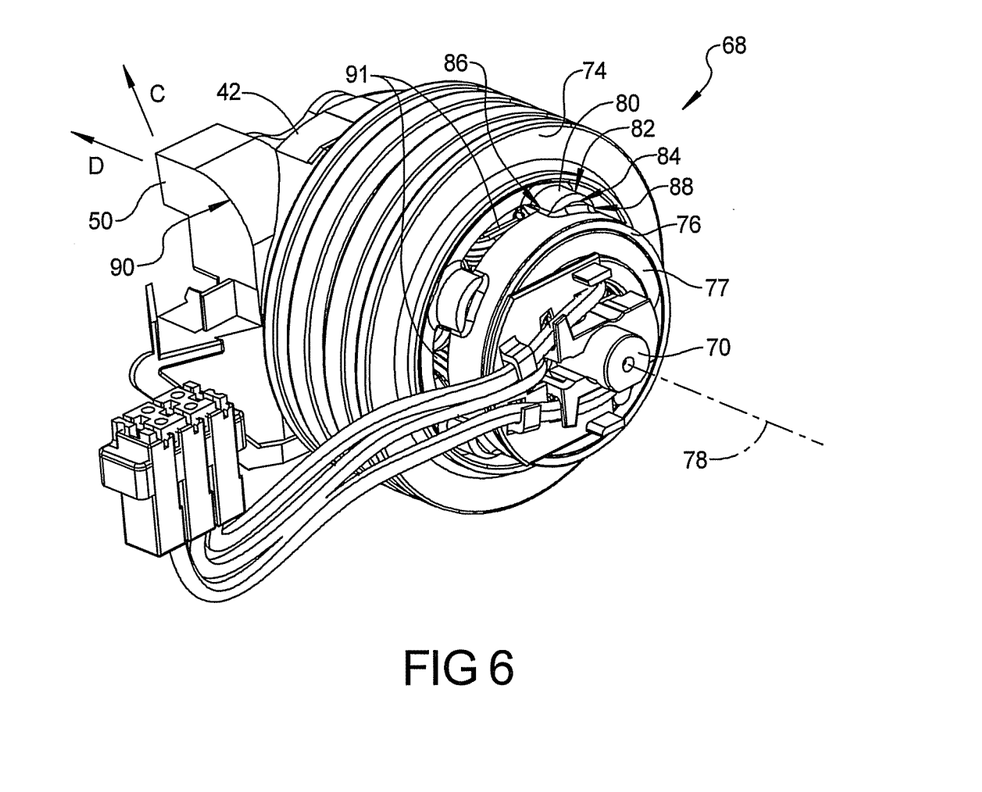
FIG. 6 is a right rear perspective view of a motor assembly of the battery powered tool of FIG. 1.

The third baffle exhaust 50 includes a curve-shaped duct portion 90 which is responsible for directing exhaust air out from third baffle exhaust 50 in each of the side upward discharge direction "C" as previously described, as well as in a horizontal discharge direction "D". By maximizing the different directions of discharge air coming from the various baffle exhausts, air flow into a plurality of intake vents 91 defined between successive ones of the rib support members 80 is maximized, and the overall air flow through tool 10 is maximized.

Referring to FIG. 7 and again to FIG. 6, multiple electronic components are mounted on a hall printed circuit board (PCB) 92 which is also supported by the structure of motor assembly 68. These include multiple electronic components 94. In order to further maximize air flow through the motor assembly 68, the hall PCB 92 is reduced in size, permitting an air intake port 96 to be created in motor assembly 68. The air intake port 96 created through hall PCB 92 extends over an intake port angular range "E" of approximately 130 degrees providing increased air flow through motor assembly 68.

Figure 7:
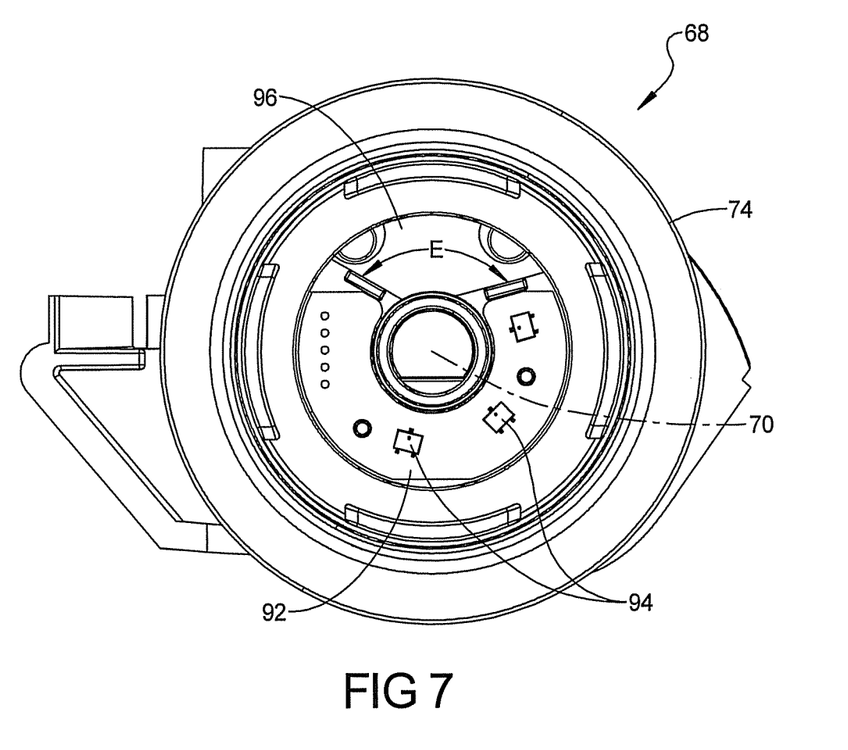
FIG. 7 is a right elevational view of the motor assembly of FIG. 6.

Referring to FIG. 8 and again to FIGS. 6-7, portions of the fan baffle 42 are removed for clarity such that features of the fan 72 are more readily visible. Multiple fan support members 97 support fan 72. Fan 72 includes a plurality of fan blades 98 whose body width axes are each axially aligned with the longitudinal axis defining the axis of rotation 78 of motor shaft 70. Spaces between the fan support members 97 define individual fan intake vents 99. By minimizing the size/width and quantity of the fan support members 97, the volume of air that can be drawn into the fan intake vents 99 is increased.

Figure 8:
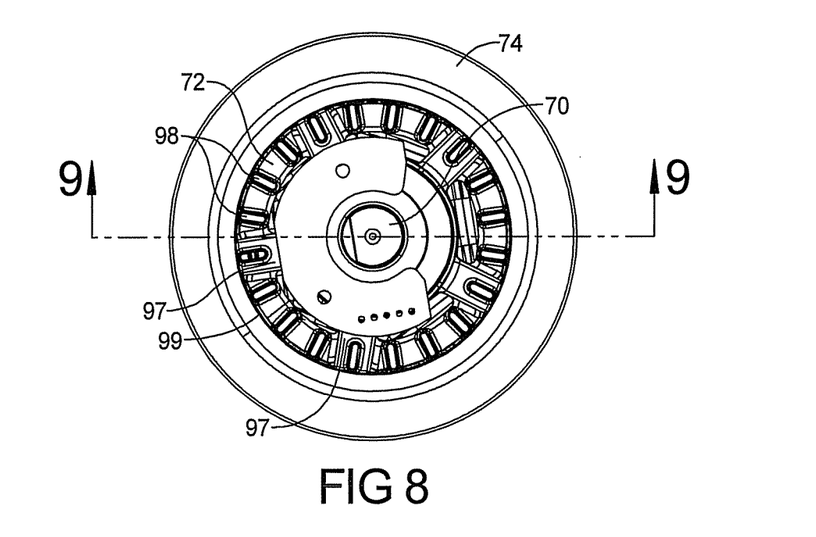
FIG. 8 is a left elevational view of the motor assembly of FIG. 6 having the ventilation ducting removed for clarity.

Referring to FIG. 9 and again to FIG. 8, each of the individual fan blades 98 are integrally connected to a circular ring/body 100 of fan 72. The geometry of circular ring/body 100 is adapted to redirect air upwardly as viewed in FIG. 9 and away from circular ring/body 100. This redirected air flow assists in forcing more of the air flow toward the exhaust vents, further minimizing the amount of back flow of the heated air recirculating into housing 12 during operation of motor assembly 68.

Figure 9:
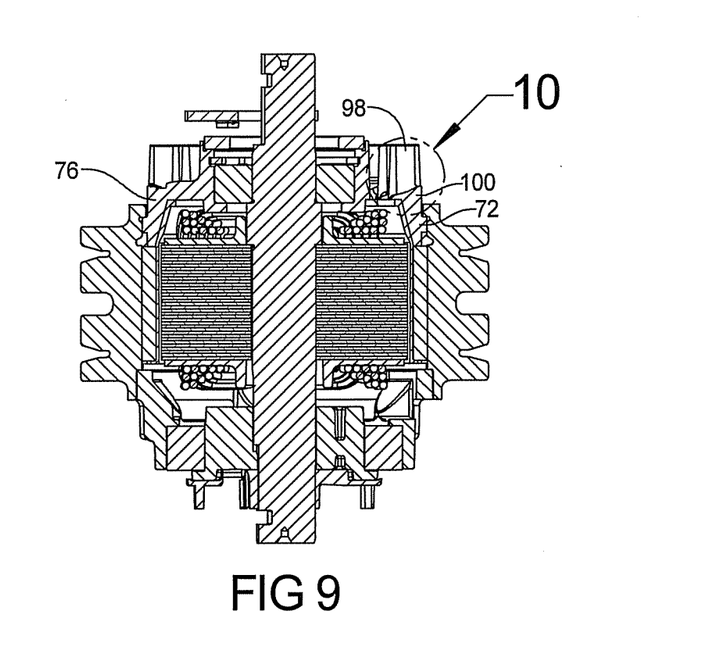
FIG. 9 is a bottom plan cross sectional view taken at section 9 of FIG. 8.
Figure 10:
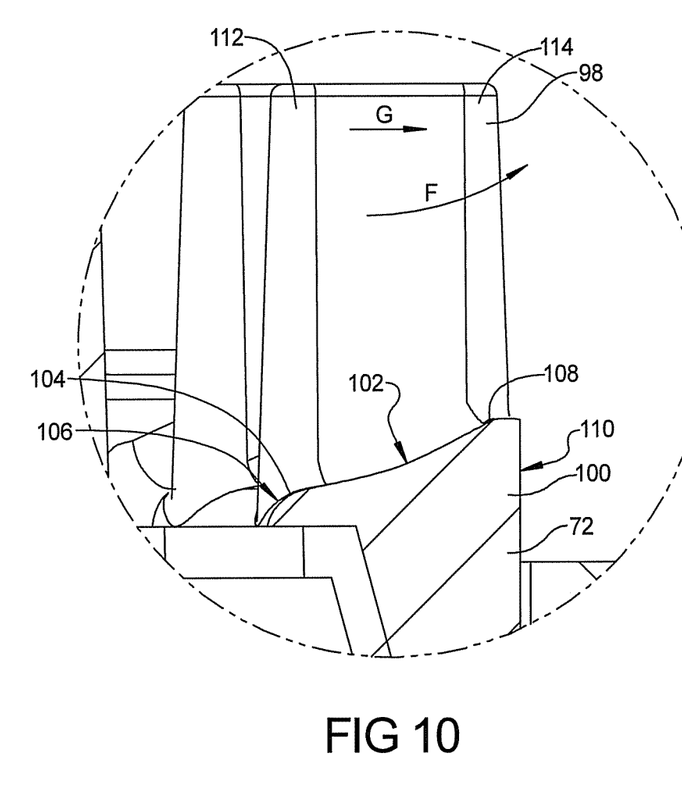
FIG. 10 is a bottom plan cross sectional view of area 10 of FIG. 9.

Referring to FIG. 10 and again to FIGS. 8-9, the circular ring/body 100 of fan 72 includes an upwardly sloping, concave shaped surface 102 which extends between a ring minimum height portion 104 proximate to a ring inner wall 106 to a ring maximum height portion 108 positioned proximate to a ring outer wall 110. The function of concave shaped surface 102 is to direct the air flow in a redirected air flow path "F" as the air contacts the concave shaped surface 102. The redirected air flow path "F" moves the exhaust air upwardly and away from fan 72 as viewed in FIG. 10. The advantage created by the geometry of concave shaped surface 102 is that the air flow takes the redirected air flow path "F" in lieu of a non-redirected air flow path "G" which is oriented normal with respect to the individual fan blades 98. Each of the fan blades 98 further includes an interior rounded surface 112 and an exterior rounded surface 114 which are blended into the geometry of concave shaped surface 102. This blended geometry also reduces air turbulence at the junction between the individual fan blades 98 and concave shaped surface 102.

Referring generally to the figures, in an embodiment of a system and apparatus of a substantially sealed cooling system 26 of fastening battery powered tool 10, the cooling system 26 is sealed from the rest of the tool, in which fresh air is pulled across the electronics module 38, through the motor assembly 68, into the fan 72 and then directed out of the tool via an exhaust baffle 46, along a defined path in order to cool the electronics module 38 and motor assembly 68. Also, in an embodiment, a method for and apparatus defining an intake path for cooling air flow across the electronics module 38 and motor assembly 68 that includes exhausting heated air from the tool so that the heated air is prevented from blowing back into the tool.

Referring generally to the figures, the battery powered tool 10 mounts or integrates a fan on one side of the motor assembly 68 (left side when viewed from the rear, or the assembly side in the example shown). Tool exhaust vents 28, 30, 32 are positioned on the same side, and the tool intake vents 36, 37, 40 are positioned at the rear of the tool. The motor assembly 68 has the motor intake vents 91 on the opposite side of the fan 72 (the motor intake vents 91 are on the right side or cover side). The air flow paths are as follows. The air will come in through the rear tool intake vents 36, 37, 40, go across the electronics module 38, go through the cover side motor intake vents 91, go through the fan 72; and exhaust out of the tool exhaust vents 28, 30, 32. Ribbing geometry is added to the module and the housing. This geometry serves two functions. The geometry forces all air to go across the electronics module 38, and structurally supports the electronics module 38 in the case of high shock or drop of the tool.

The cooling system 26 limits the amount of air that can be pulled across the electronics module 38 because the motor assembly 68 has restrictions in series with the electronics module restriction. In order to generate more cooling air flow across the electronics module 38, a 2nd (lower restriction) intake as air intake port 96 is added to the motor baffle/hall PCB mount and hall 92. In order to accomplish this, the hall PCB 92 has a substantially "U" shaped design. Although a higher motor temperature can result, the motor assembly 68 has a higher temperature limit and the amount of airflow through the motor assembly 68 drops less than 10% because the fan 72 is being "starved", therefore the fan 72 is more efficient as airflow volume increases.

To reduce recirculation back into the battery powered tool 10, the following design is used. The exhaust side restriction is reduced by having, for example, three exhaust scrolls (baffle geometry) as exhaust vents 28, 30, 32 coming off of the motor fan 72. This design is able to achieve approximately 230 degrees of fan exhaust. The baffle overlaps the fan exhaust. For this, a "redirection ramp" as concave shaped surface 102 is integrated on the fan 72.

The assembly side intake supports as rib support members 80, for example 5 (five) in quantity each has an oval shape (in lieu of a rectangular geometry). In non-limiting examples, an airfoil shape can be used for a single direction rotation; and the oval shape can be used for either directional operation. The aforementioned shapes are used primarily to reduce the pressure generated by the leading edge 86 of the rib support members 80. A rectangular geometry would act as a radial fan and generate high pressure regions. These high pressure regions would work against the intentional fan and significantly reduce airflow. The high pressure regions would also reduce the effective motor intake area. The aforementioned shapes are therefore used secondarily because the oval shaped support rib support members 80 minimize the boundary layer on the trailing edge 88. By reducing the boundary layer, the effective motor intake increases. Any motor intake area gained at the stationary bearing support 77 is directly a gain in area because there are no rotational losses to be considered.

Several advantages provided by the cooling system 26 of the battery powered tool 10 include the following. Effective cooling of the motor assembly 68 and the electronics module 38 is provided with the motor assembly 68 mounted perpendicular to the electronics module 38. All cool intake air is directed across the electronics module 38. Cooling of the system, particularly the electronics, is maximized by incorporating two separate intake vents for the motor fan 72 (airflow is increased greater than 200%). Integration of the fan exhaust baffle 42 and the hall PCB 92 mount reduces part count and motor size. Integration of the fan blade 98 geometry into the motor end cap 76 reduces part count and allows the fan intake to get bigger, thereby lowering intake restriction. Motor end cap support design of rib support members 80 reduces the surface area of a leading edge 86 and thereby reduces a leading edge high pressure zone, and reduces a surface area of the trailing edge 88 thereby reducing a boundary layer at the trailing edge 88.

The cooling system 26 of battery powered tool 10 can: 1. Effectively cool the motor assembly 68 and electronics module 38 for a high power (60A peak, 37A RMS fast rate, and 23A RMS continuous rate), with the cordless nailer or battery powered tool 10 having the motor shaft 70 aligned perpendicular to the electronics module 38; 2. Get more cooling airflow than what the fan 72 can pull through the motor assembly 68; 3. Reduce the exhaust air that can re-circulate back into the tool through a gap between the stationary baffle and the rotating fan/motor; and 4. Reduce the dynamic restriction of the motor and tool exhaust.

While aspects of the present invention are described herein and illustrated in the accompanying drawings in the context of a fastening tool, those of ordinary skill in the art will appreciate that the invention, in its broadest aspects, has further applicability. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure. Furthermore, the mixing and matching of features, elements and/or functions between various examples is expressly contemplated herein, even if not specifically shown or described, so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A hand-held portable battery powered fastening tool comprising:

a housing having a housing interior, a forward end, and a rearward end, the forward and rearward ends defining a housing axis;

a handle extending from the housing;

each of said housing, housing interior, and rearward end comprising an upper portion above said housing axis and a lower portion below said housing axis when said handle is oriented so as to extend vertically downward from said lower portion of said housing;

a motor assembly comprising an outer rotor motor having a fixed motor shaft defining a motor axis and an outer rotor, said motor assembly being mounted in said housing, said motor shaft being fixedly mounted in the lower portion of the housing interior transverse to said housing axis;

a fan driven by said motor assembly and journaled to said motor shaft;

a plurality of intake vents formed in the lower portion of the rearward end of said housing and a plurality of exhaust vents formed in said forward end;

a confined air passageway in the housing interior, the passageway including a first portion in the rearward end, the passageway communicating directly with said plurality of intake vents, said first portion being defined by an internal wall that confines said first portion to the lower portion of said housing interior, and a second portion connected downstream of said first portion and communicating with said plurality of exhaust vents and with the first portion, wherein said fan is configured to draw air from an exterior of the housing through said intake vents into and through said air passageway and expel the air to the exterior of the housing through said exhaust vents; and an electronic control module mounted in the rearward end of the housing adjacent to said intake vents;

wherein said second portion of said air passageway includes a flow path through said outer rotor motor, wherein air drawn into said air passageway cools said electronic control module before flowing through said flow path and cools said motor assembly.

2. The hand-held portable battery powered fastening tool of claim 1, wherein said second portion of said air passageway is connected in series with said first portion of said air passageway.

3. The hand-held portable battery powered fastening tool of claim 2, wherein substantially all of the air drawn through said intake vents flows through said first portion of said air passageway.

4. The hand-held portable battery powered fastening tool of claim 3, wherein said electronic control module is mounted rearwardly of said motor assembly.

5. The hand-held portable battery powered fastening tool of claim 1, wherein said flow path through said motor assembly has an inlet side and an outlet side and said fan is journaled to said motor shaft on said outlet side.

6. The hand-held portable battery powered fastening tool of claim 1, wherein said housing includes interior surfaces including said internal wall that generally confine said air passageway to the lower portion of said housing interior.

7. The hand-held portable battery powered fastening tool of claim 6 wherein said plurality of exhaust vents are formed in the lower portion of said housing.

8. The hand-held portable battery powered fastening tool of claim 6 wherein said air passageway is substantially sealed from a remainder of the housing interior.

9. The hand-held portable battery powered fastening tool of claim 1, wherein an outer rotor of said outer rotor motor defines a central interior passageway that defines said flow path directing air through the motor assembly.

10. The hand-held portable battery powered fastening tool of claim 9 wherein said fan has a plurality of annular blades that define an interior circular area in the flow path of said second portion of said passageway, wherein an arcuate member is arranged transverse to said motor axis, the arcuate member obstructing at least 50% of said interior circular area.

* * * * *

UNITED STATES PATENT AND TRADEMARK OFFICE
CERTIFICATE OF CORRECTION

PATENT NO. : 9,577,493 B2  
APPLICATION NO. : 13/840015  
DATED : February 21, 2017  
INVENTOR(S) : Erik Ekstrom et al.

Page 1 of 1

It is certified that error appears in the above-identified patent and that said Letters Patent is hereby corrected as shown below:

In the Claims

In Column 10, Line 26, in Claim 10 after the word "said" insert --air--

Signed and Sealed this
Fourth Day of July, 2017

Joseph Matal
*Performing the Functions and Duties of the*
*Under Secretary of Commerce for Intellectual Property and*
*Director of the United States Patent and Trademark Office*